(12) United States Patent
Fegan et al.

(10) Patent No.: US 7,536,188 B1
(45) Date of Patent: May 19, 2009

(54) COMMUNICATION DEVICE LOCATING SYSTEM

(75) Inventors: Christopher Alexander Fegan, Darlington (AU); Paul Thomas McNamara, Sydney (AU); Muneyb Minhazuddin, Quakers Hill (AU)

(73) Assignee: Avaya Inc., Basking Ridge, NJ (US)

( * ) Notice: Subject to any disclaimer, the term of this patent is extended or adjusted under 35 U.S.C. 154(b) by 121 days.

(21) Appl. No.: 10/932,507

(22) Filed: Sep. 1, 2004

(51) Int. Cl.
*H04W 24/00* (2006.01)
(52) U.S. Cl. .............. 455/456.1; 455/456.2; 455/41.2; 455/410; 340/825.69; 340/825.72; 340/10.1; 340/539.23; 340/572.1; 370/352
(58) Field of Classification Search ... 455/456.1–456.2, 455/41.2, 457, 456.5, 404.1–404.2; 340/539.23, 340/572.1, 539.13, 539.15, 10.1, 10.4, 539.22, 340/825.69; 379/201.06–201.07
See application file for complete search history.

(56) References Cited

U.S. PATENT DOCUMENTS

| | | | |
|---|---|---|---|
| 4,275,385 A | 6/1981 | White | |
| 5,461,390 A * | 10/1995 | Hoshen | 342/419 |
| 5,515,426 A * | 5/1996 | Yacenda et al. | 379/201.07 |
| 5,550,547 A * | 8/1996 | Chan et al. | 342/42 |
| 5,555,376 A | 9/1996 | Theimer et al. | |
| 5,689,548 A | 11/1997 | Maupin et al. | |
| 5,742,666 A | 4/1998 | Alpert | |
| 5,793,861 A | 8/1998 | Haigh | |
| 5,805,999 A | 9/1998 | Inoue | |
| 5,884,262 A | 3/1999 | Wise et al. | |
| 5,960,061 A | 9/1999 | Fahie et al. | |
| 6,046,683 A | 4/2000 | Pidwerbetsky et al. | |
| 6,069,570 A | 5/2000 | Herring | |
| 6,076,121 A | 6/2000 | Levine | |
| 6,104,288 A | 8/2000 | Hopkins | |
| 6,104,711 A | 8/2000 | Voit | |
| 6,236,365 B1 | 5/2001 | LeBlanc et al. | |
| 6,249,227 B1 | 6/2001 | Brady et al. | 340/572.1 |
| 6,265,963 B1 | 7/2001 | Wood, Jr. | |
| 6,282,574 B1 | 8/2001 | Voit | |
| 6,310,549 B1 | 10/2001 | Loftin et al. | |

(Continued)

FOREIGN PATENT DOCUMENTS

CN 1141567 1/1997

(Continued)

OTHER PUBLICATIONS

Schulzrinne, "*Providing Emergency Call Services for SIP-based Internet Telephony*", printed Oct. 5, 2005, http://www.iptel.org/info/players/ietf/location/draft-schulzrinne-sip-911-00.txt, Jul. 2000, pp. 1-14.

(Continued)

*Primary Examiner*—Sharad Rampuria
(74) *Attorney, Agent, or Firm*—Sheridan Ross P.C.

(57) ABSTRACT

A system for determining the vicinity of a communication device within a communication network is provided. Individual communication devices are provided with an active identification reader capable of reporting information concerning identified passive identification tags to a location server. At least some passive identification tags have fixed or known locations, allowing a communication device capable of reading such a passive identification1 tag to be determined to be within a particular vicinity or area. Communication devices may also be provided with passive identification tags to allow other active identification readers to determine whether the communication device is in their vicinity.

26 Claims, 4 Drawing Sheets

U.S. PATENT DOCUMENTS

| | | | |
|---|---|---|---|
| 6,359,880 | B1 | 3/2002 | Curry et al. |
| 6,362,778 | B2 | 3/2002 | Neher |
| 6,377,203 | B1* | 4/2002 | Doany .................. 342/44 |
| 6,449,358 | B1 | 9/2002 | Anisimov et al. |
| 6,486,780 | B1 | 11/2002 | Garber et al. |
| 6,496,806 | B1 | 12/2002 | Horwitz et al. |
| 6,505,780 | B1* | 1/2003 | Yassin et al. ................ 235/492 |
| 6,580,908 | B1 | 6/2003 | Kroll et al. |
| 6,600,443 | B2 | 7/2003 | Landt |
| 6,650,901 | B1 | 11/2003 | Schuster et al. |
| 6,678,357 | B2 | 1/2004 | Stumer et al. |
| 6,694,787 | B1 | 2/2004 | Brown |
| 6,705,522 | B2 | 3/2004 | Gershman et al. |
| 6,707,383 | B2 | 3/2004 | Flaherty |
| 6,707,903 | B2 | 3/2004 | Burok et al. |
| 6,757,359 | B2 | 6/2004 | Stumer et al. |
| 6,778,096 | B1 | 8/2004 | Ward et al. |
| 6,804,329 | B2 | 10/2004 | Geck et al. |
| 6,825,767 | B2 | 11/2004 | Humbard |
| 6,892,052 | B2* | 5/2005 | Kotola et al. ............... 455/41.2 |
| 6,901,255 | B2* | 5/2005 | Shostak .................. 455/422.1 |
| 6,907,238 | B2 | 6/2005 | Leung |
| 6,972,682 | B2* | 12/2005 | Lareau et al. ............ 340/568.1 |
| 6,983,124 | B1* | 1/2006 | Bayley et al. ............. 455/41.2 |
| 6,989,750 | B2 | 1/2006 | Shanks et al. |
| 6,990,328 | B2 | 1/2006 | Crandall et al. |
| 7,005,985 | B1 | 2/2006 | Steeves |
| 7,030,731 | B2 | 4/2006 | Lastinger et al. |
| 7,036,729 | B2* | 5/2006 | Chung ..................... 235/385 |
| 7,040,532 | B1* | 5/2006 | Taylor et al. ................ 235/375 |
| 7,042,359 | B2 | 5/2006 | Clucas |
| 7,068,148 | B2 | 6/2006 | Shanks et al. |
| 7,088,242 | B2* | 8/2006 | Aupperle et al. ....... 340/539.32 |
| 7,123,149 | B2* | 10/2006 | Nowak et al. ............ 340/572.1 |
| 7,135,977 | B2* | 11/2006 | Burg et al. ............... 340/572.1 |
| 7,149,503 | B2* | 12/2006 | Aarnio et al. ............ 455/414.1 |
| 7,155,238 | B2* | 12/2006 | Katz ........................ 455/456.1 |
| 7,209,771 | B2* | 4/2007 | Twitchell, Jr. ............... 455/574 |
| 7,212,829 | B1* | 5/2007 | Lau et al. ................. 455/456.1 |
| 7,228,429 | B2 | 6/2007 | Monroe |
| 7,246,746 | B2* | 7/2007 | McNamara et al. ......... 235/385 |
| 7,257,108 | B2* | 8/2007 | Cheston et al. ............. 370/338 |
| 7,262,690 | B2 | 8/2007 | Heaton et al. |
| 7,266,347 | B2 | 9/2007 | Gross |
| 7,330,464 | B2 | 2/2008 | Brouwer et al. |
| 2002/0005894 | A1 | 1/2002 | Foodman et al. |
| 2002/0173328 | A1 | 11/2002 | Min |
| 2003/0008647 | A1* | 1/2003 | Takatori et al. ............. 455/420 |
| 2003/0083076 | A1* | 5/2003 | Pradhan et al. ............. 455/456 |
| 2003/0104800 | A1 | 6/2003 | Zak |
| 2003/0114104 | A1* | 6/2003 | Want et al. .................... 455/39 |
| 2003/0227540 | A1 | 12/2003 | Monroe |
| 2004/0002305 | A1* | 1/2004 | Byman-Kivivuori et al. ..... 455/41.2 |
| 2004/0029558 | A1 | 2/2004 | Liu |
| 2004/0087273 | A1* | 5/2004 | Perttila et al. ............... 455/41.2 |
| 2004/0095238 | A1 | 5/2004 | Beere |
| 2004/0134984 | A1 | 7/2004 | Powell et al. |
| 2004/0142678 | A1 | 7/2004 | Krasner |
| 2004/0186768 | A1* | 9/2004 | Wakim et al. .................. 705/14 |
| 2004/0203352 | A1 | 10/2004 | Hall et al. |
| 2004/0203944 | A1* | 10/2004 | Huomo et al. .............. 455/466 |
| 2004/0217864 | A1* | 11/2004 | Nowak et al. ............ 340/572.1 |
| 2004/0264441 | A1* | 12/2004 | Jalkanen et al. ............. 370/352 |
| 2005/0054290 | A1* | 3/2005 | Logan et al. ............... 455/41.2 |
| 2005/0063519 | A1 | 3/2005 | James |
| 2005/0068169 | A1* | 3/2005 | Copley et al. .......... 340/539.13 |
| 2005/0079817 | A1* | 4/2005 | Kotola et al. ............... 455/41.2 |
| 2005/0083911 | A1 | 4/2005 | Grabelsky et al. |
| 2005/0088299 | A1 | 4/2005 | Bandy |
| 2005/0096084 | A1* | 5/2005 | Pohja et al. ............... 455/556.1 |
| 2005/0110612 | A1* | 5/2005 | Carrender .................. 340/10.1 |
| 2005/0140507 | A1* | 6/2005 | Nam et al. ............. 340/539.13 |
| 2005/0206555 | A1* | 9/2005 | Bridgelall et al. ........... 342/127 |
| 2005/0225444 | A1* | 10/2005 | Clift et al. .............. 340/539.13 |
| 2006/0094405 | A1* | 5/2006 | Dupont .................... 455/414.1 |
| 2006/0120517 | A1 | 6/2006 | Moon et al. |
| 2006/0121916 | A1* | 6/2006 | Aborn et al. ............. 455/456.5 |
| 2006/0158310 | A1 | 7/2006 | Klatsmanyi et al. |
| 2006/0219473 | A1 | 10/2006 | Boland et al. |

FOREIGN PATENT DOCUMENTS

| | | |
|---|---|---|
| EP | 1324255 | 7/2003 |
| GB | 2298106 | 8/1996 |
| JP | H08-191311 | 7/1996 |
| JP | 2002-250768 | 9/2002 |
| WO | WO 01/95642 | 12/2001 |
| WO | 2004/092999 | 10/2004 |

OTHER PUBLICATIONS

U.S. Appl. No. 10/911,090, filed Aug. 3, 2004, Fegan et al.
Applied Generics Technical Report "NERO24 Mobile Location System (GSM Edition)," Version 1.0 (2004), pp. 1-27.
U.S. Appl. No. 10/607,414, filed Jun. 25, 2003, Becker et al.
U.S. Appl. No. 10/652,914, filed Aug. 28, 2003, Gentle et al.
U.S. Appl. No. 10/795,119, filed Mar. 5, 2004, Moon et al.
U.S. Appl. No. 10/911,090, filed Aug. 3, 2004, McNamara et al.
RFID Journal, *Frequently Asked Questions,* Manufacturing, available at http://rfidjournal.com/article/articleview/207, 7 pages.
AIM, RFID.org, Searching for RFID Information, available at http://www.aimglobal.org/technologies/rfid, 3 pages.
Wyse, *RFID,* available at http://searchnetworking.techtarget.com/sDefinition/0,,sid7_gci805987,00.html, 2 pages (updated Jan. 16, 2004).
Time Online Edition, *Global Business—The See-It-All Chip,* available at http://www.time.com/time/globalbusiness/article/0,9171,1101030922-485764-3,00.html, 3 pages (Sep. 22, 2003).
Wired News, *Radio ID Tags: Beyond Bar Codes,* available at http://www.wired.com/news/technology/0,1282,52343,00.html, 3 pages (May 20, 2002).
Newsweek, *An Internet of Things—RFID the Mark of Satan . . . ,* available at http://msnbc.msn.com/id/3068871, 4 pages (Jun. 10, 2004).
RFID, *Tracking Everything, Everywhere,* by Katherine Albrecht, available at http://www.stoprfid.org/rfid_overview.htm, 7 pages.
RFID, *Wikipedia, the free encyclopedia,* available at http://en.wikipedia.org/wiki/RFID, 3 pages (Updated May 31, 2004).
The Denver Post, *Bar Code Meets Its Match,* Section C, (Jun. 3, 2004), p. 1C and 8C.
Cisco Systems, Inc., *Cisco Emergency Responder* Version 1.1 (Oct. 2001), 5 pages.
Avaya: Communication without Boundaries, *Solving the Challenges of E911 Service with Avaya IP Telephony Networks,* White Paper, Nov. 2002, Issue 1.1, 10 pages.
Cisco Data Sheet, *Cisco Emergency Responder* Version 1.1 Jul. 2002, available at http://www.cisco.com/warp/public/cc/pd/unco/cer/prodlit/emerg_ds.htm, 7 pages.
Cisco, *Cisco Emergency Responder,* printed Feb. 11, 2003, available at http://www.cisco.com/warp/public/cc/pd/unco/cer/, 2 pages.
EIA Telecommunications Industry Association, *TIA Telecommunications Systems Bulletin: Telecommunications—IP Telephony Infrastructures—IP Telephony Support for Emergency Calling Service,* TSB-146, Mar. 2003, pp. 1-30.
RedSky Technologies, Inc.; "Welcome to RedSky's E-911 Business Watch" *E-911 Business Watch,* Issue 4 (Ot. 21, 2003), 5 pages.
Active Campus Tutorial by David Casteron dated Oct. 11, 2003, downloaded from http://activecampus-dev/ucsd.edu/ntutorial/main.htm on Apr. 12, 2005.
Location Based Services downloaded from http://www.ericsson.com/telecomreport/article.asp?aid=34&tid=tid=201&ma=1 &msa=3 on Apr. 12, 2005.
Mobile in a Minute downloaded from www.mobilein.com/location_based_services.htm on Apr. 12, 2005.

Project Mayhem by Phillip Dressen, James Gillespie, Benjamin Hoyt and Simone Nicolo, downloaded from http://www.cs.colorado.edu/upgrad/seniorproject/projects/projectmahhem.html on Apr. 12, 2005.

Avaya "Administrator's Guide for Avaya communication Manager: vols 1, 2, and 3", 555-533-506, Issue 7 (Nov. 2003), pp. 121, 129, 886, 889, 1169, 1193, 1555.

Cisco Systems, Inc., Cisco Emergency Responder Version 1.1 (Oct. 2001), 5 pages.

Comments of Nortel Networks, Before the Federal Communications Commission, May 28, 2004, pp. 1-22 with Appendices 1-4.

U.S. Appl. No. 11/369,692, Sadot et al., filed Mar. 6, 2006.

"Perimeter Security Sensor Technologies Handbook," available at http://www.nlectc.org/perimetr/full2.htm, 104 pages; printed Feb. 2, 2005.

Background of the Invention for the above-captioned application (previously provided).

Lee, "Analysis: Verizon's VoIP patents drop dime on need for reform", available at http://arstechnica.com/news.ars/post/20070425-analysis-verizons-voip-patents-drop-dime-on-need-for-reform.html, pp. 1-3, Apr. 25, 2007.

"Providing E911 services for Nortel VoIP", available at http://www.bytesnwords.com/clients/qovia/website/products/pr_overview_nortel.htm, Copyright 2004-2006 (printed Sep. 22, 2008), 1 page.

* cited by examiner

COMMUNICATION DEVICE LOCATING SYSTEM

FIELD OF THE INVENTION

The present invention is directed to providing location information related to a communication device. In particular, the present invention is related to determining the vicinity of a communication device by identifying other devices having a known location.

BACKGROUND OF THE INVENTION

Telecommunication regulations encourage that multi-line telephone systems (MLTS) report the exact location of a caller requesting emergency services to the public safety answering point (PSAP). Unlike traditional private branch exchange (PBX) solutions, multi-line telephone systems that make use of voice over Internet protocol (VoIP) solutions are unable to report the exact location of a caller.

In order to provide location information in connection with VoIP telephone systems, a number of approaches have been suggested. For example, static records may be maintained regarding the location of each communication station. In order to provide automated retrieval of such information, it may be stored as a database record associated with the extension. However, static databases are not practical to maintain in connection with VoIP systems, because of the mobile nature of VoIP.

Another solution involves the use of simple network management protocol (SNMP) to query a phone to determine the subnet that the phone or communication device is connected to. However, such systems are incapable of providing accurate location information regarding particular devices. Furthermore, depending on the network architecture, the subnetwork information may have little relation to the physical location of a communication device.

Other systems for determining the location of a communication device make use of the global positioning system (GPS). GPS is capable of providing accurate location information regarding a device. However, GPS based systems are expensive, and do not work well inside buildings and concrete structures.

Still other systems have proposed the use of radio frequency transponders that are programmed to deliver significant information related to a call when a call is made. However, the use of such a transponder requires programming of the device at the time of the emergency. In addition, in such arrangements, the transponder presents a single point of failure.

SUMMARY OF THE INVENTION

The present invention is directed to solving these and other problems and disadvantages of the prior art. In accordance with embodiments of the present invention, a communication device, such as a telephone, is provided with an active identification device. When activated, the active identification device can provide information regarding the identity of passive identification tags in the vicinity of the communication device. Such information can be provided to a location server, which can determine the vicinity or approximate location of the communication device based on the known locations of passive tags that have been identified by the active identification device. This information can in turn be provided to an emergency service provider or other authority to assist in locating a party placing a request for emergency services through the communication device.

In accordance with further embodiments of the present invention, the communication device may itself include a passive identifier tag. Active identification devices that are provided as part of other communication devices, or that are specially provided, may provide information regarding passive identification tags in their vicinity (i.e. that can be read by the active device). Accordingly, by providing both active and passive identification capabilities in a communication device, redundancy can be achieved. In particular, failure of an active identification device associated with a communication device making a call, such as a request for emergency services, does not necessarily result in a failure to determine the vicinity of the communication device.

In accordance with further embodiments of the present invention, communication devices that are adjacent to a communication device initiating a request for emergency services or otherwise acting as a communication end point can be contacted by authorities receiving or aware of the request. Those authorities can request that a party associated with the other communication device verify the validity of the call and/or provide assistance until emergency service personnel arrive. Accordingly embodiments of the present invention can detect prank calls, and can provide verification of the nature and/or location of an emergency.

DETAILED DESCRIPTION

Figure 1:
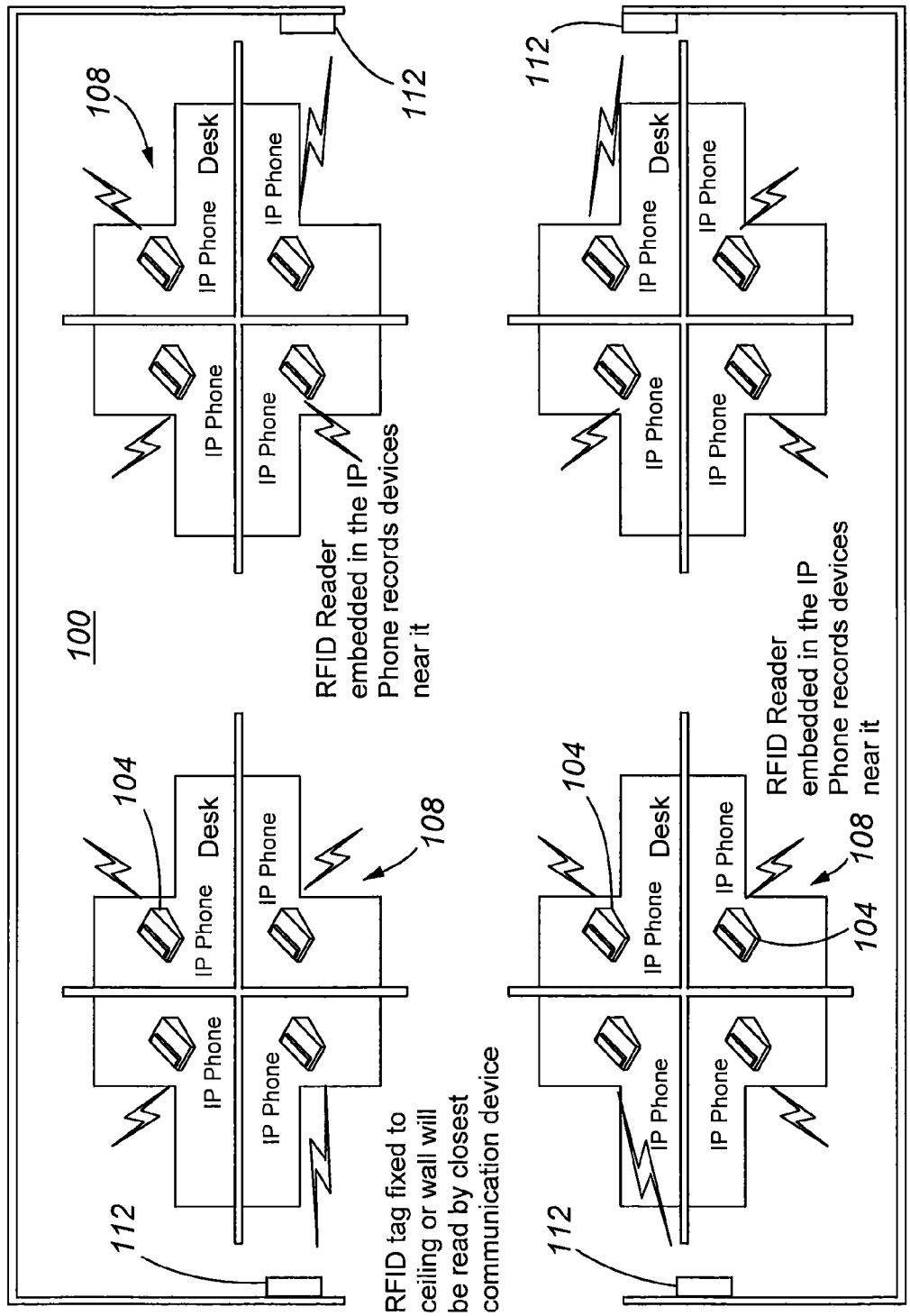
FIG. 1 depicts a multi-line telephone system that includes a communication device locating system in accordance with embodiments of the present invention.

With reference to FIG. 1, a multiple line telephone system (MLTS) incorporating a communication device locating system 100 in accordance with embodiments of the present invention is illustrated. In general, the multiple line telephone system 100 includes a number of location identification enabled communication devices 104. The communication devices 104 may comprise Internet protocol telephones. As can be appreciated by one of skill in the art from the description provided herein, communication devices 104 may additionally or alternatively include cordless or wireless telephones. Other examples include Internet protocol soft phones, which may be implemented in connection with a general purpose computer. Still other examples of communication devices include personal digital assistants having communication capabilities.

As shown in FIG. 1, the communication devices 104 may be distributed about the interior of a building in offices or cubicles 108. The system 100 additionally includes a number of fixed passive identification devices or fixed passive identifier tags 112. As will be described in greater detail elsewhere herein, active identification devices associated with the communication devices 104 may be able to read one or more nearby fixed passive identification devices 112. Furthermore, the fixed passive identification devices 112 generally have a known location. Accordingly, by reporting to a location determining application or entity that one or more specifically identified fixed passive identification devices 112 can be read by a communication device 104, the vicinity of that communication device 104 can be determined. More particularly, an authority having access to information related to the location of the identified fixed passive identification devices 112 can determine the vicinity of the communication device 104.

As depicted in FIG. 1, certain communication devices 104 may be relatively distant from any of the passive identification devices 112. Accordingly, some of the communication devices 104 may be unable to successfully read a passive identification device 112 having a fixed location. In order to extend the communication device 104 locating capabilities of the system 100, embodiments of the present invention may provide passive identification devices or tags 224 (see FIG. 2) as part of some or all of the communication devices 104. Accordingly, a communication device 104 that is unable to read a passive identification device 112 having a fixed location may still be able to identify another communication device 104 in the vicinity of the device attempting to obtain identification information. Furthermore, if the communication device 104 identified by the communication device 104 unable to read a fixed identification device 112 is itself able to read a fixed identification device 112, that information can be useful in determining the vicinity of the communication device 104 to be located. The ability to provide information regarding the identity of nearby other communication devices 104 is useful even if a communication device 104 is able to read a passive identification device having a fixed location 112. For example, such information can be used to more precisely locate a communication device 104. Furthermore, as will be described in greater detail elsewhere herein, such information can be used to contact the users of nearby communication devices 104 to verify that a request for emergency services is genuine, to provide immediate assistance to a person in need, or to otherwise participate in responding to a request for services.

Figure 2:
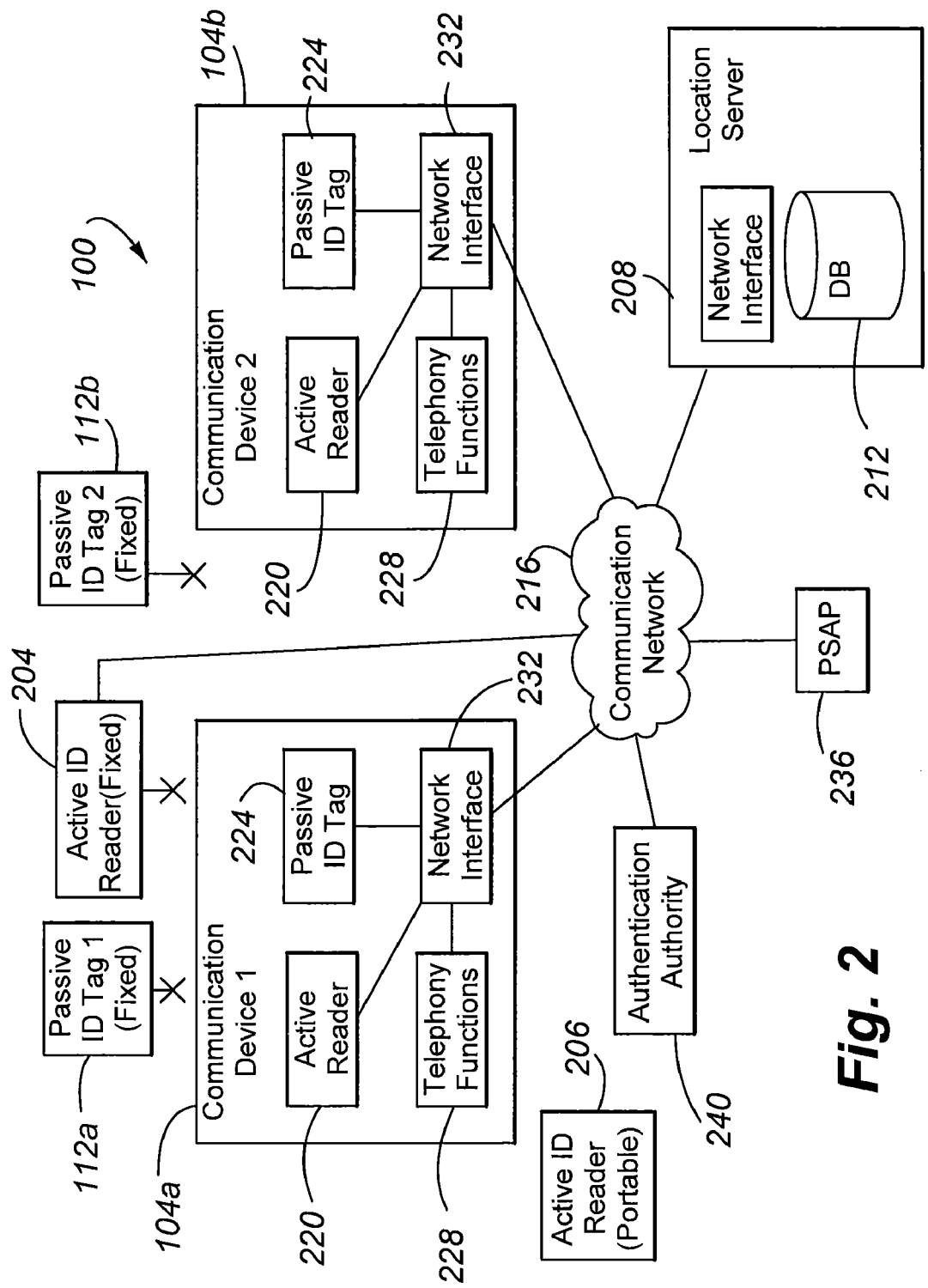
FIG. 2 is a block diagram depicting components of a communication device locating system in accordance with embodiments of the present invention.

With reference now to FIG. 2, aspects of a multiple line telephone system incorporating location identification capabilities 100 in accordance with embodiments of the present invention are illustrated. Associated with the system 100 are a number of communication devices 104. A first communication device 104a and a second communication device 104b are illustrated in FIG. 2. However, it should be appreciated that in a typical implementation, more than two communication devices 104 will be included in the system 100. The system 100 also includes fixed passive identifier devices or tags 112. In particular, a first passive identifier tag 112a and a second passive identifier tag 112b are shown. However, any number of passive identifier tags 112 may be associated with a system 100. In general, the number of passive identifier tags 112 provided as part of a system 100 will depend on the area over which location information regarding communication devices 104 is desired, and on physical aspects of that area, including the configuration and composition of walls and other structures.

The system 100 may additionally include one or more active identification readers 204 having a fixed position. The provision of an active identification reader 204 having a fixed location may provide additional redundancy and more refined location information. In accordance with still other embodiments of the present invention, the system 100 may include one or more portable active identification readers 206. Emergency personnel or other authorities may carry portable active identification readers 206 to determine when they are in the vicinity of a particular passive identification tag.

The system 100 also includes a location determining entity or server (hereinafter "location server") 208. As will be described in greater detail elsewhere herein, the location server 208 receives information regarding the identity of passive identifier tags in the vicinity of (i.e. that can be read by) an active ID reader, and from this information, provides information related to the vicinity of a particular communication device 104. In accordance with embodiments of the present invention, the location server 208 comprises a database in which records having location information for each passive (or active) identification device in the system 100 having a fixed or known location are maintained.

The various components of the system 100 may communicate with one another over a communication network 216. The communication network 216 may be used to communicate information regarding the identities of passive identification devices that can be read by an active identification reader 204 associated with the system 100. In addition, the communication network 216 may be used to establish links used to transfer communications data, such as voice telephony information.

The communication devices 104 may each include an active identification device or tag 220. In general, the active identification device 220, when operative, attempts to identify passive identification tags 112, 224 in the vicinity of the associated communication device 104. In accordance with embodiments of the present invention, the active identification device 220 of a communication device 104 comprises a radio frequency identification reader. The passive identification tags that might be read by an active identification device 220 include the passive identification tags 112 having a fixed location. In addition, one or more of the communication devices 104 may include a passive identification tag 224. Accordingly, a passive tag read by an active identification device 220 may include a passive identification tag 224 associated with another, nearby communication device 104.

A communication device 104 may additionally include communication functions, such as telephony functions 228. As can be appreciated by one of skill in the art, telephony functions 228 may include hardware and operating instructions, for example hard coded or encoded in software, that enable the communication device 104 to function as a communication end point. Accordingly, telephony functions 228 may include voice and video telephony functions. In accordance with communication devices 104 comprising personal digital assistants or other devices having textual communication capabilities, such textual communication capabilities may be provided by the telephony functions 228.

A network interface 232 is provided for interconnecting a communication device 104 to the communication network 216. The network interface 232 may include the physical hardware and/or operating instructions required to enable the transmission and/or receipt of information in connection with the communication network 216. Accordingly, examples of a network interface 232 include wired or wireless Ethernet or other Internet protocol interfaces.

The communication network 216 may comprise an Internet protocol, switched circuit, or combination of Internet protocol and switched circuit networks. Furthermore, the communication network 216 may comprise a local area network, wide area network, including the Internet, or a combination of networks.

As shown in FIG. 2, a public safety answering point (PSAP) 236 or other authority 240 may be interconnected to the system 100. As can be appreciated by one of skill in the art, a public safety answering point 236 receives requests for emergency services, and handles the dispatch of such services to the requester. If provided, the authentication authority 240 may operate to verify requests for emergency services. As will be appreciated by one of skill in the art from the description provided herein, the functions of an authentication authority 240 may, in accordance with embodiments of the present invention, be incorporated into those of the PSAP 236.

Figure 3:
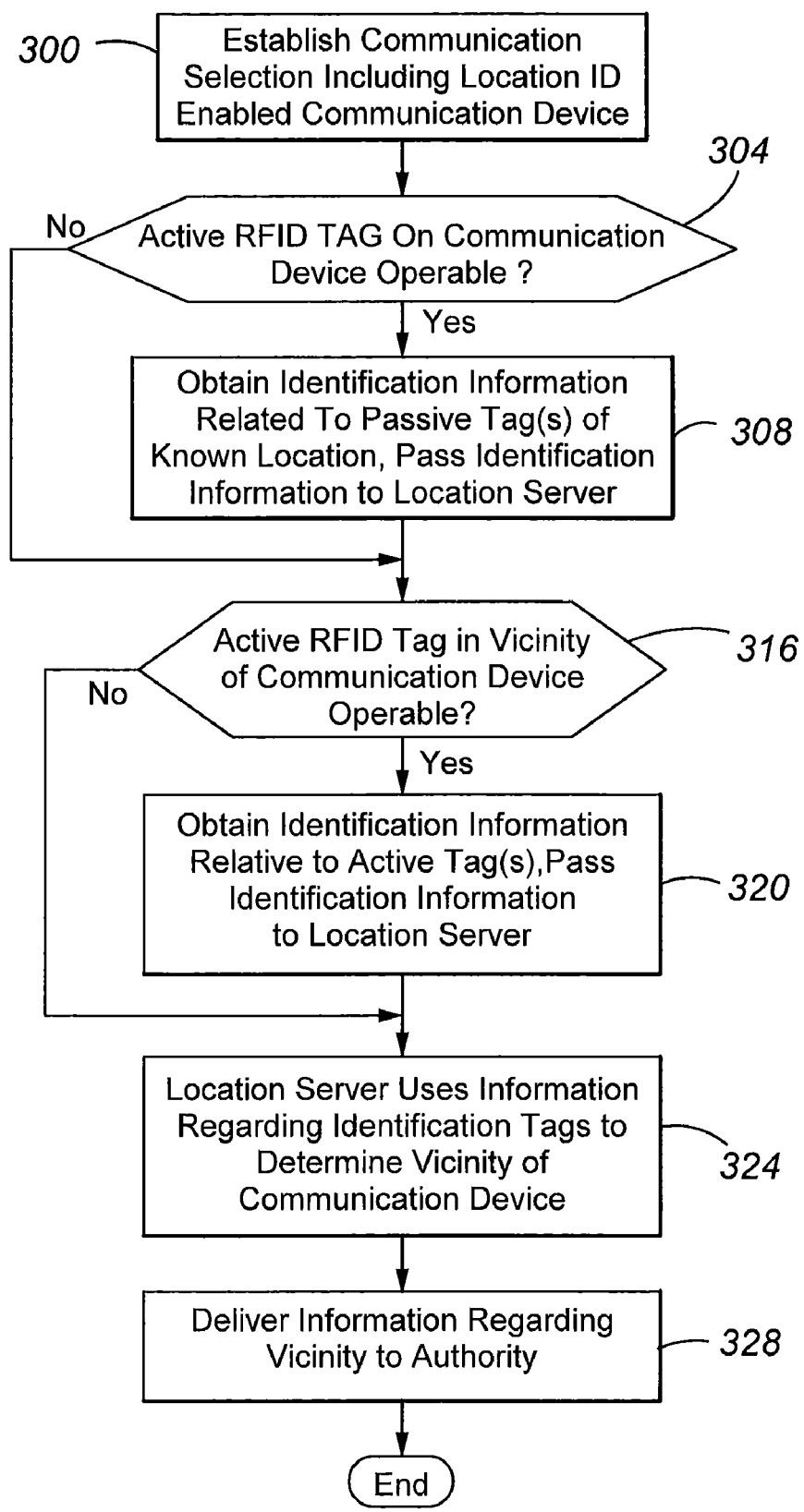
FIG. 3 is a flowchart depicting aspects of the operation of a system for locating a communication device in accordance with embodiments of the present invention.

With reference now to FIG. 3, aspects of the operation of a system 100 in accordance with embodiments of the present invention are illustrated. Initially, at step 300, a communication session that includes a location identification enabled first communication device 104a is established. A determination is then made as to whether an active identification device 220 associated with the communication device 104a is operable (step 304). If an active identification device 220 is operable, identification information related to passive tags 112 at a known location and/or passive tags 224 in other communication devices that can be read by the active identification device 220 (i.e., the identity of the passive tags 112, 224 that can be read) is obtained, and that information is passed to the location server 208 (step 308).

After providing the identification information, or if the active identification device 220 is not operable, a determination may next be made as to whether an active identification device in the vicinity of the first communication device 104a is operable (step 316). Such active identification device or tag may comprise an active identification reader having a fixed location 204. Alternatively or in addition, an active device may comprise an active identification device 220 associated with a second communication device 104b. If an active identification tag 204 or 220 is in the vicinity of the first communication device 104a, it will be able to read the passive identification tag 224 (if provided) associated with the first communication device 104a. Accordingly, those active identification devices 204, 220 that can read the passive identification tag 224 associated with the first communication device 104a will report that identifier to the location server 208 (step 320). Therefore, it can be appreciated that embodiments of the present invention allow a communication device 104 to be identified (and thus determined to be within a particular area) even if an active ID reader 220 associated with the communication device 104 is disabled or unable to communicate with the location server.

The location sever 208 may then use the provided identification information to determine the area or vicinity in which the first communication device 104a is located (step 324). In particular, from the provided identification information, the location server 208 can determine the vicinity of the first communication device 104a that established the communication session. That is, the information provided to the location server 208 regarding the identities of passive identification tags 112 that can be read by the active identification device 220 of the communication device 104a allows the location server 208 to determine those passive identification tags 112 that are near the communication device 104a. Furthermore, the range over which an active identification device 220 can successfully read a passive identification tag 112 is limited. Accordingly, with respect to a particular passive identification tag 112 that has been read by an active identification device 220, the vicinity of the communication device 104a associated with that active identification device 220 corresponds to an area described by the maximum range or radius over which a passive identification tag 112 can be identified. As can be appreciated by one of skill in the art from the description provided herein, the vicinity or area within which a communication device 104a is located can be more narrowly defined where an active identification device 220 can identify two or more passive identification tags 112. In particular, the vicinity of the communication device 104a will correspond to the area defined by the intersection of the areas within which the identified passive ID tags 112 can be read.

A communication device 104a may also provide identification information related to passive identification tags 224 associated with a second communication device 104b in the vicinity of the first communication device 104a. Such information can further assist in obtaining location information for the communication device 104a. For example, if the second communication device 104b has a fixed or registered position, the first communication device 104a will be within a known area. Providing identification information related to a nearby second communication device 104b can also assist in locating the first communication device 104a even if the second communication device 104b does not have a fixed or registered position. For example, where an active identification reader 220 associated with the second communication device 104b is able to report the identity of one or more fixed passive identification tags 112, the area or vicinity of the second communication device 104b can be determined. From the determined area or vicinity of the second communication device 104b, an area or vicinity within which the first communication device 104a is located can be determined. In accordance with still other embodiments of the present invention, the vicinity of the first communication device 104a can be determined even if the first communication device 104a is only able to provide identification information related to other communication devices 104. For instance, if the first communication device 104a is unable to identify any passive identification tags 112, it still may be able to read passive identification tags 224 associated with nearby communication devices 104. Accordingly, a chain of identification information can be created to provide location information.

The information related to the vicinity of the communication device 104a is then delivered to an authority, such as a PSAP 236 or an authentication authority 240 (step 328). The location information can be in any form. For example, the location server 208 may calculate that, based on the identified tags 112 and/or 224, the communication device is on a particular floor and in a particular room of a building, and provide that floor and room as the vicinity of the first communication device 104a. As another example, the information provided by the location server 208 may comprise a map with the determined vicinity of the first communication device 104a indicated on that map. After delivering the location information, the process may end.

Figure 4:
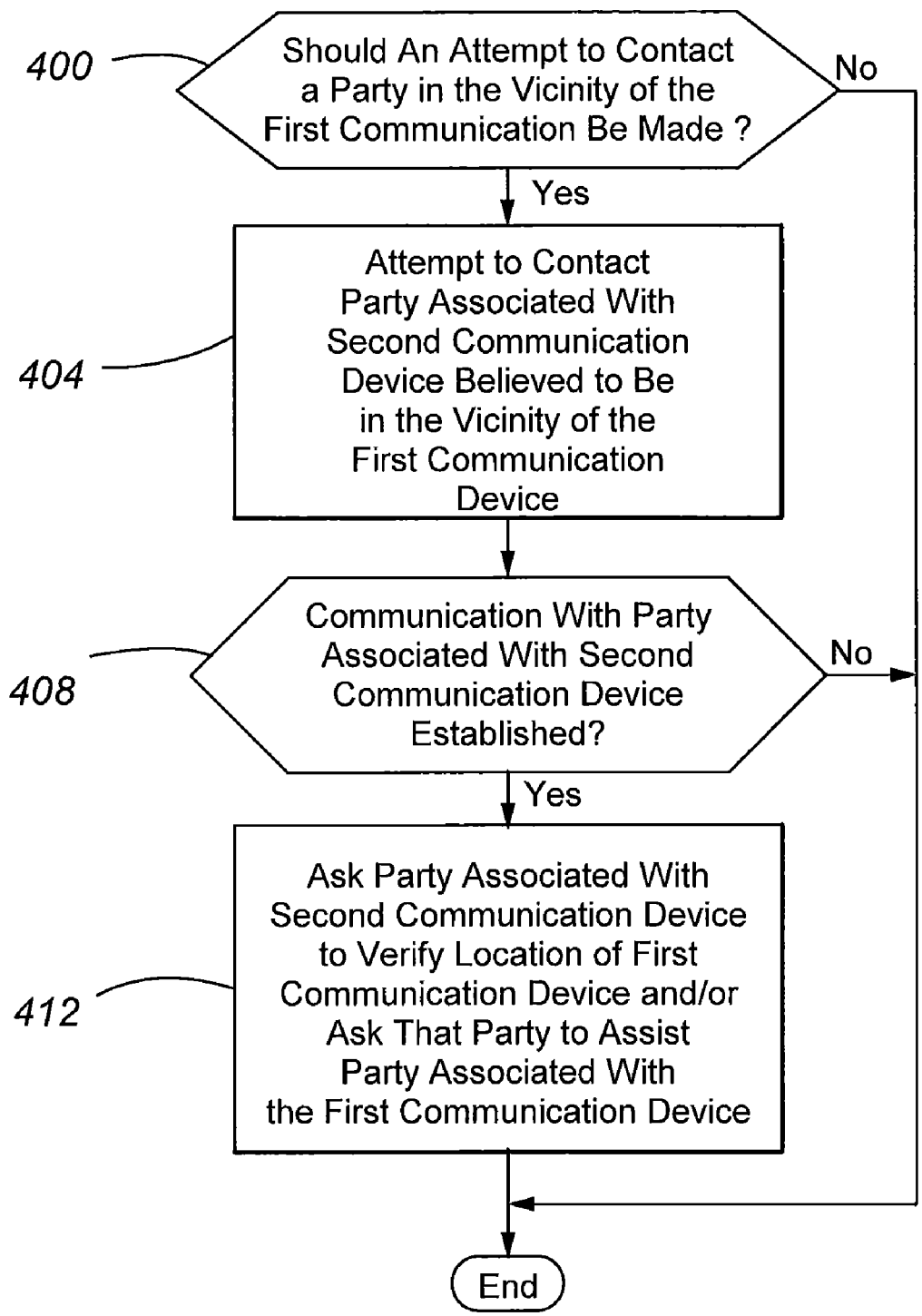
FIG. 4 is a flowchart depicting the confirmation of location information in accordance with embodiments of the present invention.

With reference now to FIG. 4, aspects of the operation of a system 100 in accordance with further embodiments of the present invention are illustrated. In step 400, a determination is made as to whether an attempt to contact a party in the vicinity of a first communication device 104a that has placed a request for services should be made. Such an attempt might be desirable in a variety of situations. For example, confirmation regarding the location of the first communication device 104a, the existence and/or nature of a reported emergency, or other information can be obtained. In addition, contacting a party in the vicinity of a communication device 104 requesting services can be used in an attempt to provide the requesting party with assistance before emergency personnel are able to reach the scene.

If it is determined that contacting another party is desirable, an attempt to contact a party associated with a second communication device 104b believed to be in the vicinity of the first communication device 104a is made (step 404). A determination may then be made as to whether communication with a party associated with a second communication device 104b has been established (step 408). If such communication has been established, the party associated with the second communication device 104b can be asked to verify information related to the request for services, and/or to provide assistance to another party (step 412). After making contact with a party associated with the second communication device 104b, or after determining that an attempt to contact such a party should not or cannot be made, the process for obtaining verification information or asking another party to provide assistance ends.

As can be appreciated by one of skill in the art from the description provided herein, a second communication device 104b that is in the vicinity (or that is believed to be in the vicinity) of a first communication device 104a can be identified. In particular, even in connection with multiple line telephone systems or other communication systems using unregistered, portable, or easily moved communication devices 104, the provision of active identification readers 204, 220 and passive identification tags 112, 224 enables communication devices 104 in the vicinity of one another to be identified. Furthermore, where at least some of the active identification readers 204 or 220 and/or at least some of the passive identification tags 112, 224 have fixed or registered locations, the area in which a particular communication device 104 is located (i.e. the vicinity of that device) can be identified.

In accordance with embodiments of the present invention, the active identification readers 204, 220 and passive identification tags 112, 224 comprise radio frequency identification devices. Furthermore, in accordance with an exemplary embodiment of the present invention, the range over which an active identification reader 204, 220 can read (i.e. identify) a passive identification tag 112, 224 is about three meters. However, systems providing other than a maximum range of about three meters can be used. In addition, as can be appreciated by one of skill in the art, physical obstructions or other environment features can alter the nominal range of such devices. In accordance with still other embodiments of the present invention, any technology using active and passive identification components that are capable of operating wirelessly or remotely can be used.

By providing information regarding the vicinity of a communication device 104, authorities can be directed to that communication device 104 reliably. In addition, embodiments of the present invention can locate a communication device 104 within a relatively narrowly defined area. For example, in accordance with embodiments of the present invention, where a passive identification tag 112, 224 must be within about three meters of an active identification reader 204, 220, the maximum area in which a communication device 104 that is able to read only a simple passive identification tag 102, 224 should be located within a circle having a center point at the identified passive identifier tag 112, 224 and a radius of three meters. Furthermore, where more than one passive identification tag 112, 224 can be identified, the area is more narrowly defined. In particular, a communication device 104 that can read two passive identification tags 112, 224 must be in the area defined by the overlap between the range circles of the two passive identification tags. Because such vicinity information is relatively discrete, personnel responding to a request for services initiated by that communication device 104 be efficiently directed to it, and the vicinity can typically be searched relatively quickly.

Although the area over which identification information can be read from a passive tag 112, 224 has in certain examples been described as being defined by a maximum range comprising a radius, it should be appreciated that areas having shapes that are not circular are possible. For example, as a result of physical obstructions, the area over which a passive tag 112, 224 can be read by an active identification reader 204, 220 can have an irregular shape. Also, different passive tag 112, 224 and/or active identification device 204, 220 configurations can result in different effective areas and/or ranges. For more accurate locating of a communication device 104, such variations may be considered by the location server 208 in providing location information. Alternatively, the location server 208 may be capable of providing useful location information even if it is not aware of or does not account for such particular variations.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention in such or in other embodiments and with various modifications required by their particular application or use of the invention. It is intended that the appended claims be construed to include the alternative embodiments to the extent permitted by the prior art.

What is claimed is:

1. A method for locating a communication device, comprising:

using a first active identification device located within a first communication device, identifying at least a first passive identification tag;

providing information identifying said at least a first passive identification tag from said first communication device to a location server;

determining from an identity of said at least a first passive identification tag provided by said first active identification device a first vicinity of said first communication device, wherein said first passive identification tag has a known location, wherein said known location of said first passive identification tag is a fixed location, and wherein said determining a first vicinity of said first communication device includes determining that said first active identification device located within said first communication device is in the vicinity of the location of the first passive identification tag; and using a second active identification device in a vicinity of said first communication device, identifying a second passive identification tag located within said first communication device;

providing information identifying said second passive identification tag from the second active identification device to said location server;

determining from an identity of said second passive identification tag provided by said second active identification device a second vicinity of said first communication device, wherein said second active identification device has a known location, wherein said known location of said second active communication device is a fixed location, wherein said determining a second vicinity of said first communication device further includes determining that said second passive identification tag located within said first communication device is in the vicinity of the second active communication device, wherein said first active identification device and said first passive identification tag comprise a first communication pair, wherein said second active identification device and said second passive identification tag comprise a second communication pair, and wherein said first vicinity of said first communication device overlaps said second vicinity of said first communication device.

2. The method of claim 1, wherein a plurality of passive identification tags are identified.

3. The method of claim 2, wherein said determining a vicinity comprises determining a defined area within which said first communication device and said passive identification tag are located.

4. The method of claim 1, wherein said passive identification tag having known location is located within a building.

5. The method of claim 1, further comprising contacting a party associated with a second communication device associated with at least one of said second active identification device and a passive identification tag having a known vicinity.

6. The method of claim 1, further comprising initiating a request for emergency services using said first communication device.

7. The method of claim 1, wherein said active identification device comprises an active radio frequency identification device and wherein said passive identification tag comprises a passive radio frequency identification tag.

8. The method of claim 1, further comprising initiating a request for a communication channel including said first communication device.

9. A communication system capable of providing information related to a location of an interconnected communication device, comprising:
   at least a first passive identification tag having a known location;
   at least a first communication device, including:
      a first active identification device capable of detecting and identifying passive identification tags;
      a second passive identification tag;
      a network interconnection, wherein said at least a first passive identification tag is in a vicinity of said active identification device, and wherein the identity of said at least a first passive identification tag in a vicinity of said first communication device is obtained by said active identification device and is passed through said network interconnection;
   a second active identification device, wherein said second active identification device has a known location;
   a location server;
   a first communication network interconnected to said location server and to said network interconnection, wherein the identity of said at least a first passive identification tag is provided to said location server by said first communication network, and wherein said location server is operable to determine information identifying a first area in which said at least a first communication device is located based on said identity and said known location of said at least a first passive identification tag;
   a second communication network interconnected to said location server and to said second active identification device, wherein the identity of said second passive identification tag is provided to said location server by said second communication network, and wherein said location server is operable to determine information identifying a second area in which said first communication device is located based on an identity of said second passive identification tag read by said second active identification device and said known location of said second active identification tag, wherein an overlap between said first and second areas defines a third area in which said first communication device is located; and
   a public safety answering point, wherein said information identifying said third area in which said first communication device is located is delivered from said location server to said public safety answering point by said communication network.

10. The system of claim 9, wherein said first communication device further comprises a passive identification tag.

11. The system of claim 10, further comprising a second communication device, including:
   an active identification device; and
   a network interconnection, wherein the identity of at least a second passive identification tag associated with said first communication device is passed through said network interconnection.

12. The system of claim 9, further comprising a second communication device, including:
   a passive identification tag.

13. The system of claim 9, further comprising a second communication device, including:
   an active identification device;
   a passive identification tag; and
   a network interconnection.

14. The system of claim 9, wherein said active identification device comprises an active radio frequency identification tag reader.

15. A communication system, comprising:
   means for providing an identifier having a fixed location; communication network means; first means for communicating, including;
   means for reading an identity from said means for providing an identifier when said means for reading is within a first area about said means for providing an identifier; and
   means for providing an identifier associated with said first means for communicating;
   means for communicating said identity read by said means for reading an identity included in said first means for communication to said communication network means;
   means for reading said identifier associated with said first means for communicating having a fixed location;
   means for communicating said identifier read by said means for reading said identifier associated with said first means for communicating to said communication network means;
   means for determining information identifying a first vicinity of said first means for communicating from said identity read by said means for reading an identity included in said first means for communicating and for determining a second vicinity of said first means for communicating from said identifier read by said means for reading said identifier,
   wherein said first vicinity of said first means for communicating overlaps said second vicinity of said first means for communicating and wherein said identity read by said means for reading an identity is communicated to said means for determining a first vicinity and a second vicinity by said communication network means; and
   a public safety answering point, wherein information comprising said information identifying a first vicinity of said first means for communicating and said information identifying a second vicinity of said first means for communicating is provided to said public safety answering point in association with a call comprising a request for emergency services initiated by said first means for communicating.

16. The system of claim 15, further comprising:
second communication device means, including:
- means for reading an identity from means for providing an identifier;
- means for providing an identifier; and
- means for communicating an identity read by said means for reading to said communication network means.

17. A computational component for performing a method, the method comprising:
- generating in a first communication device a request for a communication channel, wherein said request for a communication channel includes a request for emergency assistance;
- reading an identifier associated with a passive identification tag having a known location using an active identification device included in the first communication device; and
- providing said identifier to a location server;
- determining by the location server information identifying a vicinity of the first communication device;
- providing the determined information identifying the vicinity of the first communication device to an authority; and
- receiving by the authority the determined information identifying the vicinity of the first communication device;
- in response to receiving the determined information identifying the vicinity of the first communication device, initiating by the authority a communication with a second communication device in the vicinity of the first communication device, wherein in response to a person answering the second communication device the authority asks the person answering to verify the vicinity of the first communication device.

18. The method of claim 17, further comprising:
providing to an active identification device an identifier associated with said first communication device.

19. The method of claim 17, wherein said location server determines a vicinity of said first communication device from said identifier.

20. The method of claim 17, wherein a plurality of identifiers are read, wherein at least one of said identifiers is associated with a fixed location.

21. The method of claim 20, wherein said fixed location comprises a location registered within said location server.

22. The method of claim 17, wherein said computational component comprises a computer readable storage medium containing instructions for performing the method.

23. The method of claim 17, wherein said computational component comprises a logic circuit.

24. The method of claim 1, further comprising:
- delivering information including said determined vicinity of said first communication device to an emergency service;
- initiating by the emergency service a call to a second communication device in the vicinity of, the first communication device.

25. The method of claim 1, wherein the first communication device is a wireline voice over Internet Protocol telephone.

26. The system of claim 9, wherein said first communication device comprises a wireline Internet Protocol telephone.

* * * * *